US011641675B2

(12) United States Patent
Akkarakaran et al.

(10) Patent No.: US 11,641,675 B2
(45) Date of Patent: May 2, 2023

(54) INDICATION OF TRAFFIC DIRECTION FOR SIDELINK

(71) Applicant: QUALCOMM Incorporated, San Diego, CA (US)

(72) Inventors: Sony Akkarakaran, Poway, CA (US); Tao Luo, San Diego, CA (US); Juan Montojo, San Diego, CA (US); Kapil Gulati, Hillsborough, NJ (US); Mahmoud Taherzadeh Boroujeni, San Diego, CA (US); Jung Ho Ryu, Fort Lee, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 245 days.

(21) Appl. No.: 17/011,615

(22) Filed: Sep. 3, 2020

(65) Prior Publication Data

US 2021/0092776 A1    Mar. 25, 2021

Related U.S. Application Data

(60) Provisional application No. 62/904,514, filed on Sep. 23, 2019.

(51) Int. Cl.
*H04W 4/00* (2018.01)
*H04W 74/08* (2009.01)
*H04W 72/044* (2023.01)

(52) U.S. Cl.
CPC ..... *H04W 74/0833* (2013.01); *H04W 72/046* (2013.01)

(58) Field of Classification Search
CPC .......... H04W 74/0833; H04W 72/046
See application file for complete search history.

(56) References Cited

U.S. PATENT DOCUMENTS

| 2018/0049196 | A1 |   | 2/2018 | Gupta et al. | |
| 2019/0124698 | A1 | * | 4/2019 | Wu | H04W 8/005 |
| 2020/0052767 | A1 | * | 2/2020 | Wang | H04B 7/0695 |
| 2020/0092685 | A1 | * | 3/2020 | Fehrenbach | H04W 4/46 |
| 2020/0396703 | A1 | * | 12/2020 | Luo | H04W 8/005 |
| 2020/0396717 | A1 | * | 12/2020 | Luo | H04W 76/14 |
| 2021/0392718 | A1 | * | 12/2021 | Ryu | H04W 76/28 |
| 2022/0174774 | A1 | * | 6/2022 | Tseng | H04W 72/1263 |

FOREIGN PATENT DOCUMENTS

| CN | 107113651 A | * | 8/2017 | ........ H04W 12/0013 |
| EP | 3700101 A1 | | 8/2020 | |
| WO | 2019078661 A1 | | 4/2019 | |
| WO | WO-2020064529 A1 | * | 4/2020 | ........... H04B 17/318 |

OTHER PUBLICATIONS

International Search Report and Written Opinion—PCT/US2020/049462—ISA/EPO—dated Dec. 4, 2020.

* cited by examiner

*Primary Examiner* — Thai D Hoang
(74) *Attorney, Agent, or Firm* — ArentFox Schiff LLP

(57) ABSTRACT

Aspects of the present disclosure provide techniques for configuring device-to-device (D2D) communication in new radio (NR) for one or more user equipments (UEs). Specifically, features of the present disclosure provide techniques for initial beam-pairing for sidelink communication that optimize communication resources (e.g., resource pools) by indicating the direction of traffic (e.g., transmit or receive) during the initial beam-pairing procedure and to establish sidelink communication without the need for scheduling request transmissions between the UEs.

20 Claims, 4 Drawing Sheets

INDICATION OF TRAFFIC DIRECTION FOR SIDELINK

CROSS-REFERENCE TO RELATED APPLICATION(S)

The application claims benefit of U.S. Provisional Application Ser. No. 62/904,514, entitled "INDICATION OF TRAFFIC DIRECTION FOR SIDELINK" and filed Sep. 23, 2019, which is expressly incorporated by reference herein in its entirety.

BACKGROUND

The present disclosure relates to wireless communication systems, and more particularly, to device-to-device (D2D) communication that indicates the direction of traffic during the initial access procedures.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

SUMMARY

Aspects of the present disclosure provide techniques for configuring device-to-device (D2D) communication in new radio (NR) for one or more user equipments (UEs). Specifically, features of the present disclosure provide techniques for initial beam-pairing for sidelink communication that optimize communication resources (e.g., resource pools) by indicating the direction of traffic (e.g., transmit or receive) during the initial beam-pairing procedure and to establish sidelink communication without the need for scheduling request transmissions between the UEs.

In one example, a method for wireless communication is disclosed. The method may include initiating, at a first user equipment (UE), an initial beam-pairing procedure to establish sidelink communication with a second UE. The method may further include determining whether the first UE is scheduled to one or both of transmit or receive data from the second UE. The method may further include identifying a direction of traffic based on determining whether the first UE is scheduled to one or both of transmit or receive the data from the second UE. The method may further include transmitting a random access signal on resources corresponding to a beam synchronization control signal from the first UE to the second UE, wherein the random access signal includes information associated with the direction of traffic.

In another example, an apparatus for wireless communications. The apparatus may include a memory having instructions and a processor configured to execute the instructions to initiate, at a first UE, an initial beam-pairing procedure to establish sidelink communication with a second UE. The processor may further be configured to execute the instructions to determine whether the first UE is scheduled to one or both of transmit or receive data from the second UE. The processor may further be configured to execute the instructions to identify a direction of traffic based on determining whether the first UE is scheduled to one or both of transmit or receive the data from the second UE. The processor may further be configured to execute the instructions to transmit a random access signal on resources corresponding to a beam synchronization control signal from the first UE to the second UE, wherein the random access signal includes information associated with the direction of traffic.

In some aspects, a non-transitory computer readable medium includes instructions stored therein that, when executed by a processor, cause the processor to perform the steps of initiating, at a first UE, an initial beam-pairing procedure to establish sidelink communication with a second UE. The processor may further execute the instructions for determining whether the first UE is scheduled to one or both of transmit or receive data from the second UE. The processor may further execute the instructions for identifying a direction of traffic based on determining whether the first UE is scheduled to one or both of transmit or receive the data from the second UE. The processor may further execute the instructions for transmitting a random access signal on resources corresponding to a beam synchronization control signal from the first UE to the second UE, wherein the random access signal includes information associated with the direction of traffic.

In certain aspects, another apparatus for wireless communication is disclosed. The apparatus may include means for initiating, at a first UE, an initial beam-pairing procedure to establish sidelink communication with a second UE; means for determining whether the first UE is scheduled to one or both of transmit or receive data from the second UE; means for identifying a direction of traffic based on determining whether the first UE is scheduled to one or both of transmit or receive the data from the second UE; and means for transmitting a random access signal on resources corresponding to a beam synchronization control signal from the first UE to the second UE, wherein the random access signal includes information associated with the direction of traffic.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
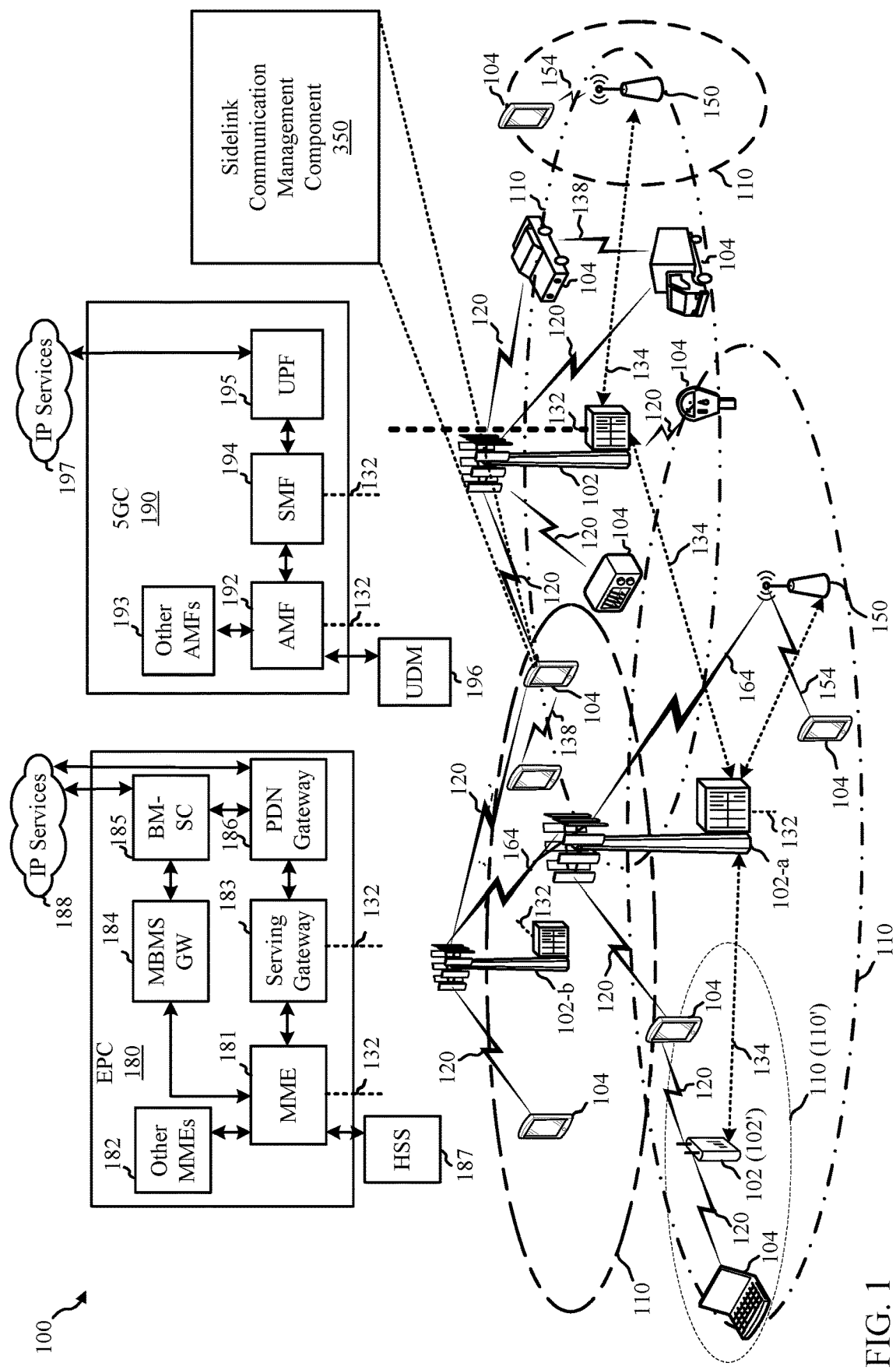
FIG. 1 is a schematic diagram of an example of a wireless communications system in accordance with aspects of the present disclosure.

In recent years, with the introduction of a myriad of smart handheld devices, user demands for mobile broadband has dramatically increased. For example, the drastic growth of bandwidth-hungry applications such as video streaming and multimedia file sharing are pushing the limits of current cellular systems. One solution to address the increased demand for bandwidth is reliance on functionalities for direct UE to UE communication (which may also be referred to as device-to-device (D2D) or sidelink communication), which allow two nearby devices (e.g., UEs) to communicate with each other in the cellular bandwidth without base station involvement or with limited base station involvement. However, introduction of D2D poses many new challenges to long-standing cellular architecture, which is centered around the base station managing the array of mobile devices within its coverage area.

For example, typically in access-link scenario (e.g., communication management by base station), a UE requesting transmission of uplink traffic may first transmit a scheduling request (SR) to the base station indicating that the UE has uplink data to send such that the base station may schedule the UE with uplink grants. Conversely, if the base station has downlink data to send to the UE, the base station may schedule the UE on the downlink. Further, in situations where the UE requests to receive data from the base station or the network (e.g., downlink traffic), the UE may again send appropriate upper-layer signaling which results in generation of downlink data at the base station which is scheduled on the downlink by the base station. In each instance, the initial access begins with random access procedure or connection setup, and a SR itself is only needed to initiate presence of uplink data.

In long-term evolution (LTE) architecture, a UE could generally transmit on the sidelink resources in transmitter resources pool without the need for any SR to be transmitted by either UE. In such instances, the nature of the transmission may depend on resource pool configuration (e.g., mode-1, mode-2 scheduling, etc.). However, no scheduling request signal is required to initiate sidelink communication. Instead, UEs may have preconfigured transmission and reception pools, or may try to acquire sidelink synchronization signals (SLSS) for synchronization in time and frequency and pool configuration information from other sidelink UEs. However, even then, all subsequent sidelink communications do not require any SR transmissions to schedule a sidelink transmission or reception.

Building on the LTE architecture, one aspect of the 5G NR communications technology includes the use of high-frequency spectrum bands, such as those above 24 GHz, which may be referred to as millimeter wave (mmW) bands. The use of these bands enables extremely high data rates and significant increases in data processing capacity. However, compared to LTE, mmW bands are susceptible to rapid channel variations and suffer from severe free-space path loss and atmospheric absorption. In addition, mmW bands are highly vulnerable to blockage (e.g. hand, head, body, foliage, building penetration). Particularly, at mmW frequencies, even small variations in the environment, such as the turn of the head, movement of the hand, or a passing car, may change the channel conditions between the base station and the user equipment, and thus impact communication performance.

Current mmW 5G NR systems leverage the small wavelengths of mmW at the higher frequencies to make use of multiple input multiple output (MIMO) antenna arrays to create highly directional beams that focus transmitted radio frequency (RF) energy in order to attempt to overcome the propagation and path loss challenges in both the uplink and downlink links. Thus, unlike LTE, direct transmissions such as D2D or sidelink communication between multiple UEs requires some initial access procedures to establish beam pairing even when in the coverage area of a base station. However, currently there are no established beam-pairing procedures or techniques for facilitating sidelink communication in 5G NR systems.

Aspects of the present disclosure solve the above-identified problem by provide techniques for configuring D2D communication in NR for one or more user equipments (UEs). Specifically, features of the present disclosure provide techniques for initial beam-pairing for sidelink communication that optimize communication resources (e.g., resource pools) by indicating the direction of traffic (e.g., transmit or receive or both) during the initial beam-pairing procedure and to establish sidelink communication without the need for SR transmissions.

To this end, the initial beam-pairing techniques for sidelink communication in 5G NR systems of the present disclosure may include transmitting a random access signal (e.g., Physical Random Access Channel (PRACH)) on resources corresponding to a beam synchronization control signal (e.g., synchronization signal block (SSB)) from the first UE to the second UE. In some aspects, the random access signal may be transmitted on resource corresponding to a beam from a plurality of SSB beams that may be identified by the UEs as supporting a high received signal-to-noise ratio (SNR) (e.g., if the signal quality on a particular beam exceeds a predetermined threshold). Once the beam pairing is established, both UEs may directly transmit to each other (provided appropriate overlap between transmit (Tx) and receiver (Rx) resource pools) using the identified beam(s).

Additionally, in order to optimize resource pool management, the random access signal may additionally indicate a direction of traffic requested by the UE that identifies whether a UE initiating sidelink communication (e.g., first UE) is requesting transmission only, reception only, or both transmission and reception of data from a second UE. In some examples, the direction of traffic may be indicated using partitioning of PRACH sequence-space and/or resource-space. In some instances, the details of the nature of Rx data (e.g., upper-layer traffic type, etc.) may also be indicated, either in subsequent initial-access message, or by further PRACH partitioning.

Thus, in one instance where the first UE intends to only receive data from the second UE, the indication of direction of traffic in the random access signal during the initial beam-pairing sequence may allow the second UE to forego monitoring the Rx resource pools for transmissions from the first UE. In other words, understanding that the first UE only intends to receive data from the second UE, the second UE may determine that the first UE does not intend to transmit any data to the second UE. Thus, the second UE may conserve resources by electing not to monitor the resources corresponding to the Rx resource pool corresponding to the second UE. This may help the second UE to reuse those resources to transmit or receive other communication of possibly higher priority with other UE(s) and/or base station (s), and/or reduce the power consumption of the second UE by reduced resource monitoring.

Similarly, in an instance where the first UE intends to only transmit data to the second UE, the indication of direction of traffic in the random access signal may allow the first UE to not activate its Rx resource pool because the second UE would know not to transmit to the first UE. However, if the direction of traffic indication identifies that the first UE requests to both transmit and receive data, both Tx and Rx resource pools may be activated for both the first UE and the second UE.

For non-reciprocal cases (or cases of UE(s) without Tx-Rx beam correspondence) (e.g., where the first UE determines a receive beam to receive and identify a suitable SSB, but is then unable to form a transmit beam with a beam shape close enough to the receive beam shape, or similarly, the second UE is unable to form a receive beam with shape close enough to the transmit beam it used to transmit the SSB), features of the present disclosure further provide beam-sweeping the random access signal (with the direction of traffic indication) over a plurality of beams such that the second UE may detect the random access signal at the Rx beam suitable for the second UE. In some instances, the first UE may repeat transmission of the random access signal on each of a plurality of Tx beams in order to allow the second UE opportunity to optimize the Rx beam of the second UE and establish communication on the identified beam for subsequent transmission from the first UE. However, in some instances, the need for repeated transmissions of the random access signal over the plurality of beams may be unnecessary if the first UE only intends to receive data from the second UE, and thus there would not be a need for any subsequent transmissions. In some instances, these repeated transmissions may be needed even if the first UE only intends to receive data from the second UE, if the received data has to be acknowledged, eg, by HARQ feedback indication, in which case, the repetition improves the reliability of this acknowledgment feedback.

Various aspects are now described in more detail with reference to the FIGS. 1-4. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is a diagram illustrating an example of a wireless communications system and an access network 100 for sidelink communication in accordance with aspects of the present disclosure. In particular, The wireless communications system 100 may include one or more base stations 102, one or more UEs 104, and a core network, such as an Evolved Packet Core (EPC) 180 and/or a 5G core (5GC) 190. The one or more base stations 102 and/or UEs 104 may operate according to millimeter wave (mmW or mmWave) technology. For example, mmW technology includes transmissions in mmW frequencies and/or near mmW frequencies. Specifically, extremely high frequency (EHF) is part of the radio frequency (RF) in the electromagnetic spectrum where the EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave.

As noted above, communications using the mmW and/or near mmW radio frequency band have extremely high path loss and a short range. Thus, the propagation characteristics of the mmWave environment demands deployment of dense gNBs 102 (i.e., base stations 102 in NR technology) to guarantee line-of-sight links at any given time and decrease the probability of outage. Certain UEs 104 may also communicate with each other using device-to-device (D2D) communication link 138. The D2D communication link 138 may use the DL/UL WWAN spectrum. The D2D communication link 138 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR. To this end, the UEs 104 may include a sidelink communication management component 350 (see FIG. 3) to implement techniques for configuring D2D communication in NR for one or more UEs. Specifically, the sidelink communication management component 350 may implement initial beam-pairing for sidelink communication that optimize communication resources (e.g., resource pools) by indicating the direction of traffic (e.g., transmit or receive) during the initial beam-pairing procedure and to establish sidelink communication without the need for SR transmissions The EPC 180 and/or the 5GC 190 may provide user authentication, access authorization, tracking, internet protocol (IP) connectivity, and other access, routing, or mobility functions. The base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC 180 or the 5GC 190), with one another over backhaul links 132, 134 (e.g., Xn, X1, or X2 interfaces) which may be wired or wireless communication links.

The base stations 102 may wirelessly communicate with the UEs 104 via one or more base station antennas. Each of the base stations 102 may provide communication coverage for a respective geographic coverage area 110. In some examples, base stations 102 may be referred to as a base transceiver station, a radio base station, an access point, an access node, a radio transceiver, a NodeB, eNodeB (eNB), gNB, Home NodeB, a Home eNodeB, gNodeB (gNB), a relay, a transceiver function, a basic service set (BSS), an extended service set (ESS), a transmit reception point (TRP), or some other suitable terminology. The geographic coverage area 110 for a base station 102 may be divided into sectors or cells making up only a portion of the coverage area (not shown). The wireless communication network 100 may include base stations 102 of different types (e.g., macro base stations 102 or small cell base stations 180, described below).

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. The wireless communication network 100 may be a heterogeneous technology network in which different types of base stations provide coverage for various geographical regions. For example, each base station 102 may provide communication coverage for a macro cell, a small cell, or other types of cell. The term "cell" is a 3GPP term that may be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 104 with service subscriptions with the network provider. A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 104 with service subscriptions with the network provider. A femto cell may also cover a small geographic area (e.g., a home) and may provide restricted access and/or unrestricted access by UEs 104 having an association with the femto cell (e.g., in the restricted access case, UEs 104 in a closed subscriber group (CSG) of the base station 102, which may include UEs 104 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARD) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 104 may be dispersed throughout the wireless communication network 100, and each UE 104 may be stationary or mobile. A UE 104 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 104 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Some non-limiting examples of UEs 104 may include a session initiation protocol (SIP) phone, a satellite radio, a global positioning system, a multimedia device, a video device, a digital audio player (e.g., MP3 player), a camera, a game console, a smart device, a wearable device, a vehicle, an electric meter, a gas pump, a large or small kitchen appliance, a healthcare device, an implant, a sensor/actuator, a display, or any other similar functioning device. Additionally, a UE 104 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 104 may be able to communicate with various types of base stations 102 and network equipment including macro eNBs, small cell eNBs, macro gNBs, small cell gNBs, gNB, relay base stations, and the like.

UE 104 may be configured to establish one or more wireless communication links 120 with one or more base stations 102. The wireless communication links 120 shown in wireless communication network 100 may carry uplink (UL) transmissions from a UE 104 to a base station 102, or downlink (DL) transmissions, from a base station 102 to a UE 104. Each wireless communication link 120 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 120 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 120 may represent one or more broadcast channels.

In some aspects of the wireless communication network 100, base stations 102 or UEs 104 may include multiple antennas for employing antenna diversity schemes to improve communication quality and reliability between base stations 102 and UEs 104. Additionally or alternatively, base stations 102 or UEs 104 may employ multiple input multiple output (MIMO) techniques that may take advantage of multi-path environments to transmit multiple spatial layers carrying the same or different coded data.

Wireless communication network 100 may also support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 104 may be configured with multiple downlink CCs and one or more uplink CCs for carrier aggregation. Carrier aggregation may be used with both FDD and TDD component carriers. The communication links 120 may use multiple-input and multiple-output (MIMO) antenna technology, including spatial multiplexing, beamforming, and/or transmit diversity. The base stations 105 and/or UEs 110 may use spectrum up to Y MHz (e.g., 5, 10, 15, 20, 30, 50, 100, 200, 400, etc., MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communication network 100 may further include base stations 102 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

The small cell may operate in a licensed and/or an unlicensed frequency spectrum. When operating in an unlicensed frequency spectrum, the small cell may employ NR and use the same 5 GHz unlicensed frequency spectrum as used by the Wi-Fi AP. The small cell, employing NR in an unlicensed frequency spectrum, may boost coverage to and/or increase capacity of the access network.

In a non-limiting example, the EPC 180 may include a Mobility Management Entity (MME) 181, other MMES 182, a Serving Gateway 183, a Multimedia Broadcast Multicast Service (MBMS) Gateway 184, a Broadcast Multicast Service Center (BM-SC) 185, and a Packet Data Network (PDN) Gateway 186. The MME 181 may be in communication with a Home Subscriber Server (HSS) 187. The MME 181 is the control node that processes the signaling between the UEs 110 and the EPC 180. Generally, the MME 181 provides bearer and connection management. All user Internet protocol (IP) packets are transferred through the Serving Gateway 183, which itself is connected to the PDN Gateway 186. The PDN Gateway 186 provides UE IP address allocation as well as other functions. The PDN Gateway 186 and the BM-SC 185 are connected to the IP Services 188. The IP Services 188 may include the Internet, an intranet, an IP Multimedia Subsystem (IMS), a PS Streaming Service, and/or other IP services. The BM-SC 185 may provide functions for MBMS user service provisioning and delivery. The BM-SC 185 may serve as an entry point for content provider MBMS transmission, may be used to authorize and initiate MBMS Bearer Services within a public land mobile network (PLMN), and may be used to schedule MBMS transmissions. The MBMS Gateway 184 may be used to distribute MBMS traffic to the base stations 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

Figure 2:
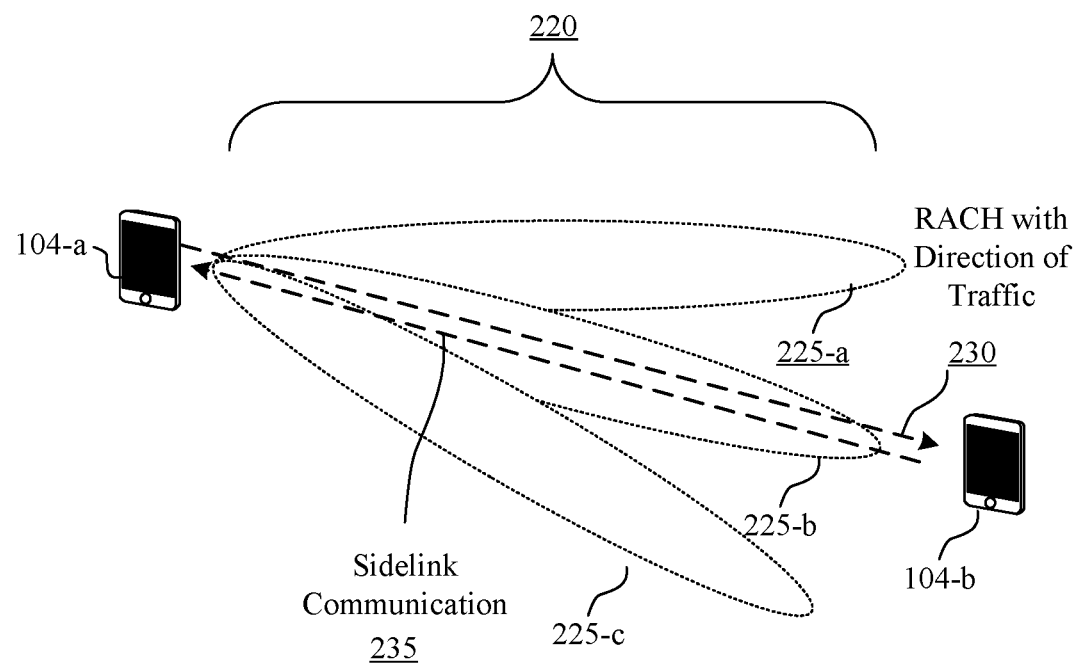
FIG. 2 is a schematic diagram of an example of a wireless communication system implementing a D2D communication in accordance with aspects of the present disclosure.

FIG. 2 illustrates a schematic diagram 300 that supports beam-pairing for sidelink communication in accordance with aspects of the present disclosure. Specifically, beamforming is a technique for directional signal transmission and reception. Schematic diagram 300 illustrates an example of beamforming operations, and may include a first UE 104-a and second UE 104-b.

As discussed above, one aspect of the 5G NR communications technology includes the use of high-frequency spectrum bands, such as those above 24 GHz, which may be referred to as mmW bands. While, the use of these bands enables extremely high data rates and significant increases in data processing capacity, mmW bands are susceptible to rapid channel variations and suffer from severe free-space path loss and atmospheric absorption. In addition, mmW bands are highly vulnerable to blockage (e.g. hand, head, body, foliage, building penetration). Particularly, at mmW frequencies, even small variations in the environment, such as the turn of the head, movement of the hand, or a passing car, may change the channel conditions between the base station and the user equipment, and thus impact communication performance.

To address this problem, mmW 5G NR systems may leverage the small wavelengths of mmW at the higher frequencies to make use of MIMO antenna arrays to create highly directional beams that focus transmitted RF energy in order to attempt to overcome the propagation and path loss challenges in both the uplink and downlink links. To this end, a beamforming array of one or more UEs 104 may include one or more antennas 365 (see FIG. 3) for employing MIMO techniques that may take advantage of multi-path environments to transmit multiple spatial layers carrying the same or different coded data. Because D2D communication does not require SR transmissions before direct communication between a plurality of UEs 104 and 5G NR requires some initial access procedure to establish beam pairing, aspects of the present disclosure provide techniques for configuring D2D communication in NR for one or more UEs 104. Specifically, features of the present disclosure provide techniques for initial beam-pairing (e.g., selecting a beam (e.g., beam 225-b) from a plurality of beams 225 for sidelink communication that optimize communication resources (e.g., resource pools) by indicating the direction of traffic (e.g., transmit or receive) during the initial beam-pairing procedure and to establish sidelink communication without the need for SR transmissions.

Beamforming at a transmitter may involve phase-shifting the signal produced at different antennas 365 in an array to focus a transmission in a particular direction. The phase-shifted signals may interact to produce constructive interference in certain directions and destructive interference in other directions. By focusing the signal power, a transmitter may improve communication throughput while reducing interference with neighboring transmitters.

Similarly, beamforming at a receiver may involve phase-shifting a signal received from different antennas 365. When combining the phase shifted signals, the receiver may amplify a signal from certain directions and reduce the signal from other directions. In some cases, receivers and transmitters may utilize beamforming techniques independently of each other. In other cases, a transmitter and receiver may coordinate to select a beam direction. The use of beamforming may depend on factors such as the type of signal being transmitted and the channel conditions. For example, directional transmissions may not be useful when transmitting to multiple receivers, or when the location of the receiver is unknown. Thus, beamforming may be appropriate for unicast transmissions, but may not be useful for broadcast transmissions. Also, beamforming may be appropriate when transmitting in a high frequency radio band, such as in the mmW band.

Since the beamforming array size is proportional to the signal wavelength, smaller devices (e.g., UEs) may also be capable of beamforming in high frequency bands. Also, the increased receive power may compensate for the increased path loss at these frequencies. In some examples, beamforming pattern 220 may include one or more beams 225, which may be identified by individual beam IDs (e.g., first beam 225-a, second beam 225-b, third beam 225-c, etc.).

Generally, in systems such as 5G NR mmW systems, a transmitter (e.g., first UE 104-a) may transmit a plurality of directional candidate beams 225 (e.g., 225-a, 225-b, 225-c) towards the desired second UE 104-b for communication. In turn, the second UE 104-b may measure reference signal received power (RSRP) of each candidate beam 225 to identify one or more beams that maximize receiver SNR. Based on the RSRP measurements, the UEs 104 may select one or more beams (e.g., first beam 225-a) from a plurality of candidate beams 325 for communication.

In accordance with aspects of the present disclosure, the initial beam-pairing techniques for sidelink communication in 5G NR systems of the present disclosure may include transmitting a random access signal 230 (e.g., Physical Random Access Channel (PRACH)) on resources corresponding to a beam synchronization control signal (e.g., synchronization signal block (SSB)) from the first UE to the second UE. In some aspects, the random access signal 230 may be transmitted on a beam 225-b from a plurality of beams 225 that may be identified by the UEs 104 as supporting a high SNR (e.g., if the signal quality on a particular beam (e.g., second beam 228-b) exceeds a predetermined threshold). Once the beam pairing is established, both UEs may directly transmit to each other 235 (provided appropriate overlap between Tx and Rx resource pools) using the identified beam(s).

Additionally, in order to optimize resource pool management, the random access signal 230 may additionally indicate a direction of traffic requested by the UE 104 that identifies whether a UE initiating sidelink communication (e.g., first UE 104-a) is requesting transmission only, reception only, or both transmission and reception of data from a second UE 104-b. In some examples, the direction of traffic may be indicated using partitioning of PRACH sequence-space and/or resource-space. In some instances, the details of the nature of Rx data (e.g., upper-layer traffic type, etc.) may also be indicated, either in subsequent initial-access message, or by further PRACH partitioning.

Thus, in one instance where the first UE 104-a intends to only receive data from the second UE 104-b, the indication of direction of traffic in the random access signal 230 during the initial beam-pairing sequence may allow the second UE 104-b to forego monitoring the Rx resource pools for transmissions from the first UE 104-a. Thus, the second UE 104-b may conserve resources by electing not to monitor the resources corresponding to the Rx resource pool corresponding to the second UE 104-b.

Similarly, in an instance where the first UE 104-a intends to only transmit data to the second UE 104-b, the indication of direction of traffic in the random access signal 230 may allow the first UE 104-a to not activate its Rx resource pool because the second UE 104-b would know not to transmit to the first UE 104-a. However, if the direction of traffic indication identifies that the first UE 104-a requests to both transmit and receive data, both Tx and Rx resource pools may be activated for both the first UE 104-a and the second UE 104-b.

For non-reciprocal cases (or cases of UE(s) without Tx-Rx beam correspondence) (e.g., where the first UE 104-a determines a receive beam to receive and identify a suitable SSB, but is then unable to form a transmit beam with a beam shape close enough to the receive beam shape, or similarly, the second UE 104-b is unable to form a receive beam with shape close enough to the transmit beam it used to transmit the SSB), features of the present disclosure further provide beam-sweeping the random access signal 230 (with the direction of traffic indication) over a plurality of beams 225 such that the second UE 104-b may detect the random access signal 230 at the Rx beam suitable for the second UE 104-b. In some instances, the first UE 104-a may repeat transmission of the random access signal 230 on each of a plurality of Tx beams in order to allow the second UE 104-b opportunity to optimize the Rx beam of the second UE 104-b and establish communication 235 on the identified beam for subsequent transmission from the first UE 104-a. However, in some instances, the need for repeated transmissions of the random access signal 230 over the plurality of beams 225 may be unnecessary if the first UE 104-a only intends to receive data from the second UE 104-b, and thus there would not be a need for any subsequent transmissions. In some instances, these repeated transmissions may be needed even if the first UE 104-a only intends to receive data from the second UE 104-b, if the received data has to be acknowledged, e.g., by HARQ feedback indication, in which case, the repetition improves the reliability of this acknowledgment feedback.

It should be noted that although the above description mentions SSBs and associated PRACH resources, the waveforms of the "SSB" transmissions do not have to resemble the SSBs used by gNB for access link or the sidelink SSBs, and similarly, the waveforms of the "PRACH" transmissions do not have to resemble the access link PRACH. The SSB in the context of this invention refers to any sidelink transmit beams used for the purpose of initial beam pairing. Similarly, PRACH refers to any signal for which resources are associated with the corresponding SSB, in order to facilitate the beam pairing. The PRACH resources may be contention-based, or contention-free, or a combination of both. Information may be included with the PRACH transmission via partitioning of PRACH resources (i.e., the selected PRACH resource indicates the information to be included), or via a payload message carried in the PRACH (for example, in the case of '2-step RACH'-like operation, where the PRACH includes both a sequence transmission and a payload transmission)

Figure 3:
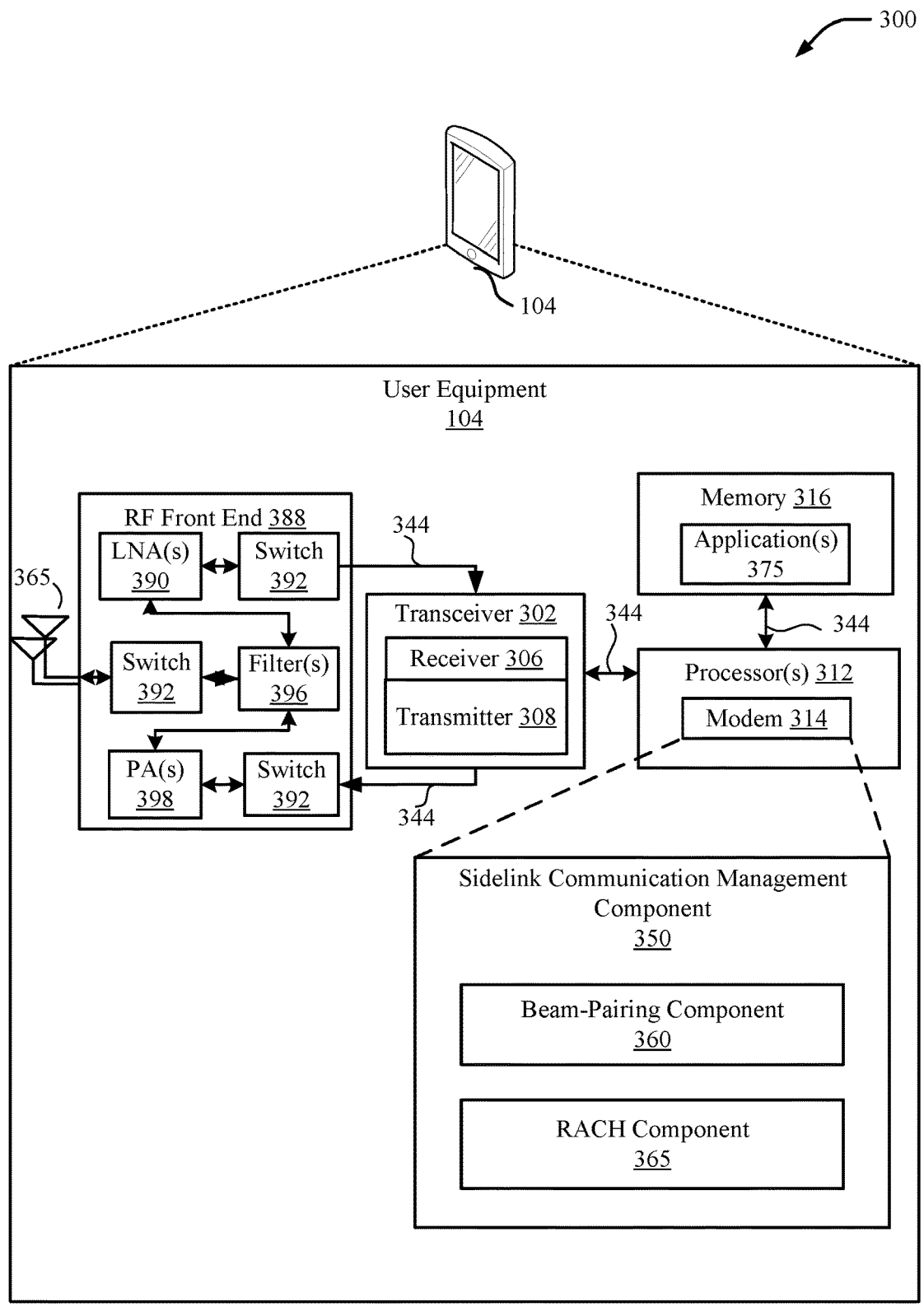
FIG. 3 is a schematic diagram of an example implementation of various components of a user equipment in accordance with various aspects of the present disclosure.

FIG. 3 illustrates a hardware components and subcomponents of a device that may be a UE 104 for implementing one or more methods (e.g., method 400) described herein in accordance with various aspects of the present disclosure. For example, one example of an implementation of the UE 104 may include a variety of components, some of which have already been described above, but including components such as one or more processors 312, memory 316 and transceiver 302 in communication via one or more buses 344, which may operate in conjunction with the communication management component 350 to perform functions described herein related to including one or more methods (e.g., 400) of the present disclosure.

The one or more processors 312, modem 314, memory 316, transceiver 302, RF front end 388 and one or more antennas 365, may be configured to support voice and/or data calls (simultaneously or non-simultaneously) in one or more radio access technologies. In an aspect, the one or more processors 312 can include a modem 314 that uses one or more modem processors. The various functions related to communication management component 350 may be included in modem 314 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 314 associated with communication management component 350 may be performed by transceiver 302.

The memory 316 may be configured to store data used herein and/or local versions of application(s) 375 or communication management component 350 and/or one or more of its subcomponents being executed by at least one processor 312. The memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, the memory 316 may be a non-transitory computer-readable storage medium that stores one or more computer-executable codes defining communication management component 350 and/or one or more of its subcomponents, and/or data associated therewith, when the UE 104 is operating at least one processor 312 to execute sidelink communication management component 350 and/or one or more of its subcomponents. The sidelink communication management component 350 may include a beam-pairing component 360 for identifying a beam(s) from a plurality of beams to establish sidelink communication with at least one second UE. In some examples, the beam-pairing component 360 may coordinate with a RACH component 365 to transmit a random access signal on resources corresponding to a beam synchronization control signal from the first UE to the second UE. As discussed above, in some instances, the random access signal may include information associated with the direction of traffic The transceiver 302 may include at least one receiver 306 and at least one transmitter 308. The receiver 306 may include hardware, firmware, and/or software code executable by a processor for receiving data, the code comprising instructions and being stored in a memory (e.g., computer-readable medium). The receiver 306 may be, for example, a radio frequency (RF) receiver. In an aspect, the receiver 306 may receive signals transmitted by at least one UE 104. Additionally, receiver 306 may process such received signals, and also may obtain measurements of the signals, such as, but not limited to, Ec/Io, SNR, RSRP, RSSI, etc. The transmitter 308 may include hardware, firmware, and/or software code executable by a processor for transmitting data, the code comprising instructions and being stored in a memory (e.g., computer-readable medium). A suitable example of the transmitter 308 may including, but is not limited to, an RF transmitter.

Moreover, in an aspect, transmitting device may include the RF front end 388, which may operate in communication with one or more antennas 365 and transceiver 302 for receiving and transmitting radio transmissions, for example, wireless communications transmitted by at least one base station 102 or wireless transmissions transmitted by UE 104. The RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, the LNA 390 can amplify a received signal at a desired output level. In an aspect, each LNA 390 may have a specified minimum and maximum gain values. In an aspect, the RF front end 388 may use one or more switches 392 to select a particular LNA 390 and its specified gain value based on a desired gain value for a particular application.

Further, for example, one or more PA(s) 398 may be used by the RF front end 388 to amplify a signal for an RF output at a desired output power level. In an aspect, each PA 398 may have specified minimum and maximum gain values. In an aspect, the RF front end 388 may use one or more switches 392 to select a particular PA 398 and its specified gain value based on a desired gain value for a particular application.

Also, for example, one or more filters 396 can be used by the RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, the RF front end 388 can use one or more switches 392 to select a transmit or receive path using a specified filter 396, LNA 390, and/or PA 398, based on a configuration as specified by the transceiver 302 and/or processor 312.

As such, the transceiver 302 may be configured to transmit and receive wireless signals through one or more antennas 365 via the RF front end 388. In an aspect, the transceiver 302 may be tuned to operate at specified frequencies such that transmitting device can communicate with, for example, one or more base stations 102 or one or more cells associated with one or more base stations 102. In an aspect, for example, the modem 314 can configure the transceiver 302 to operate at a specified frequency and power level based on the configuration of the transmitting device and the communication protocol used by the modem 314.

In an aspect, the modem 314 can be a multiband-multimode modem, which can process digital data and communicate with the transceiver 302 such that the digital data is sent and received using the transceiver 302. In an aspect, the modem 314 can be multiband and be configured to support multiple frequency bands for a specific communications protocol. In an aspect, the modem 314 can be multimode and be configured to support multiple operating networks and communications protocols. In an aspect, the modem 314 can control one or more components of transmitting device (e.g., RF front end 388, transceiver 302) to enable transmission and/or reception of signals from the network based on a specified modem configuration. In an aspect, the modem configuration can be based on the mode of the modem 314 and the frequency band in use. In another aspect, the modem configuration can be based on UE configuration information associated with transmitting device as provided by the network during cell selection and/or cell reselection.

Figure 4:
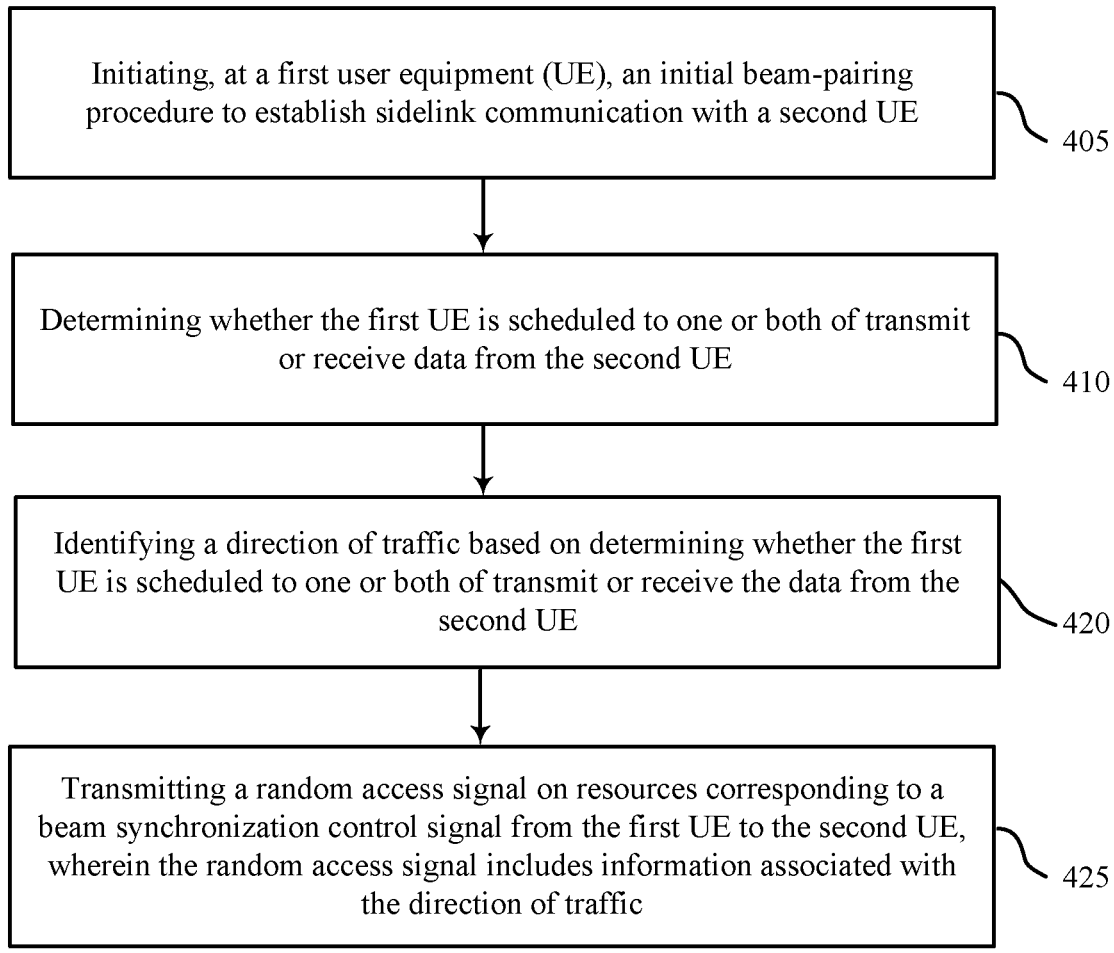
FIG. 4 is a flow diagram of an example of a method of wireless communication implemented by the UE in accordance with aspects of the present disclosure.

Referring to FIG. 4, an example method 400 for wireless communications in accordance with aspects of the present disclosure may be performed by one or more UEs 104 discussed with reference to FIGS. 1 and 2. Although the method 400 is described below with respect to the elements of the UE 104, other components may be used to implement one or more of the steps described herein.

At block 405, the method 400 may include initiating, at a first UE, an initial beam-pairing procedure to establish sidelink communication with a second UE. Aspects of block 405 may be performed by the sidelink communication management component 350, and more particularly the beam-pairing component 360 as described with reference to FIG. 3. Thus, the sidelink communication management component 350, beam-pairing component 360, modem 314, processor 312, and/or the UE 104 or one of its subcomponents may define the means for initiating, at a first UE, an initial beam-pairing procedure to establish sidelink communication with a second UE.

At block 410, the method 400 may include determining whether the first UE is scheduled to one or both of transmit or receive data from the second UE. Aspects of block 410 may also be performed by the sidelink communication management component 350, and more particularly by the RACH component 365 as described with reference to FIG. 3. Thus, the sidelink communication management component 350, RACH component 365, modem 314, processor 312, and/or the UE 104 or one of its subcomponents may define the means for determining whether the first UE is scheduled to one or both of transmit or receive data from the second UE.

At block 415, the method 400 may include identifying a direction of traffic based on determining whether the first UE is scheduled to one or both of transmit or receive the data from the second UE. In some examples, identifying the direction of traffic may include determining that the first UE requests receiving the data from the second UE, and identifying the direction of traffic as a transmission from the second UE to the first UE, wherein the direction of traffic indication from the second UE to the first UE allows the second UE to omit monitoring a receiver pool of resources for any transmission from the second UE. In other examples, identifying the direction of traffic may include determining that the first UE requests transmission of the data to the second UE, and identifying the direction of traffic as a transmission from the first UE to the second UE, wherein the direction of traffic indication from the first UE to the second UE allows the first UE to omit monitoring a receiver pool of resources for any transmission from the second UE. In yet another example, identifying the direction of traffic may include determining that the first UE requests both transmission and reception of the data, and identifying the direction of traffic as a dual transmission from the first UE to the second UE and to the first UE from the second UE, wherein the dual transmission traffic indication configures the first UE to activate both transmitter and receiver pools of resources. Aspects of block 415 may be performed by the sidelink communication management component 350, and more particularly by the RACH component 365 as described with reference to FIG. 3. Thus, the sidelink communication management component 350, RACH component 365, modem 314, processor 312, and/or the UE 104 or one of its subcomponents may define the means for identifying a direction of traffic based on determining whether the first UE is scheduled to one or both of transmit or receive the data from the second UE.

At block 420, the method may include transmitting a random access signal on resources corresponding to a beam synchronization control signal from the first UE to the second UE, wherein the random access signal includes information associated with the direction of traffic. In some examples, transmitting the random access signal may include identifying a beam from a plurality of directional beams to establish sidelink communication between the first UE and the second UE, wherein the first UE and the second UE directly communicate to each other using the identified beam. In other examples, transmitting the random access signal may include transmitting the random access signal on a plurality of beams in order to allow the second UE to identify a beam from the plurality of beams to establish sidelink communication between the first UE and the second UE. Aspects of block 420 may be performed by the transceiver 302, sidelink communication management component 350, and the RACH component 365 as described with reference to FIG. 3. Thus, the transceiver 302, sidelink communication management component 350, RACH component 365, modem 314, processor 312, and/or the UE 104 or one of its subcomponents may define the means for transmitting a random access signal on resources corresponding to a beam synchronization control signal from the first UE to the second UE, wherein the random access signal includes information associated with the direction of traffic.

Some Further Example Embodiments

An example method for wireless communications comprising: initiating, at a first user equipment (UE), an initial beam-pairing procedure to establish sidelink communication with a second UE; determining whether the first UE is scheduled to one or both of transmit or receive data from the second UE; identifying a direction of traffic based on determining whether the first UE is scheduled to one or both of transmit or receive the data from the second UE; and transmitting a random access signal on resources corresponding to a beam synchronization control signal from the first UE to the second UE, wherein the random access signal includes information associated with the direction of traffic.

The above example method, wherein transmitting the random access signal may include identifying a beam from a plurality of directional beams to establish sidelink communication between the first UE and the second UE, wherein the first UE and the second UE directly communicate to each other using the identified beam.

Any of the above example methods, wherein transmitting the random access signal may include transmitting the random access signal on a plurality of beams in order to allow the second UE to identify a beam from the plurality of beams to establish sidelink communication between the first UE and the second UE.

Any of the above example methods, wherein identifying the direction of traffic based on determining whether the first UE is scheduled to one or both of transmit or receive the data from the second UE, comprises: determining that the first UE requests receiving the data from the second UE; identifying the direction of traffic as a transmission from the second UE to the first UE, wherein the direction of traffic indication from the second UE to the first UE allows the second UE to omit monitoring a receiver pool of resources for any transmission from the second UE.

Any of the above example methods, wherein identifying the direction of traffic based on determining whether the first UE is scheduled to one or both of transmit or receive the data from the second UE, comprises: determining that the first UE requests transmission of the data to the second UE; identifying the direction of traffic as a transmission from the first UE to the second UE, wherein the direction of traffic indication from the first UE to the second UE allows the first UE to omit monitoring a receiver pool of resources for any transmission from the second UE.

Any of the above example methods, wherein identifying the direction of traffic based on determining whether the first UE is scheduled to one or both of transmit or receive the data from the second UE, comprises: determining that the first UE requests both transmission and reception of the data; identifying the direction of traffic as a dual transmission from the first UE to the second UE and to the first UE from the second UE, wherein the dual transmission traffic indication configures the first UE to activate both transmitter and receiver pools of resources.

An example apparatus for wireless communications, comprising: a memory configured to store instructions; a processor communicatively coupled with the memory, the processor configured to execute the instructions to: initiate, at a first user equipment (UE), an initial beam-pairing procedure to establish sidelink communication with a second UE; determine whether the first UE is scheduled to one or both of transmit or receive data from the second UE; identify a direction of traffic based on determining whether the first UE is scheduled to one or both of transmit or receive the data from the second UE; and transmit a random access signal on resources corresponding to a beam synchronization control signal from the first UE to the second UE, wherein the random access signal includes information associated with the direction of traffic.

The above example apparatus, wherein the instructions to transmit the random access signal may include instructions executed by the processor to identify a beam from a plurality of directional beams to establish sidelink communication between the first UE and the second UE, wherein the first UE and the second UE directly communicate to each other using the identified beam.

Any of the above example apparatus, wherein the instructions to transmit the random access signal may include instructions executed by the processor to transmit the random access signal on a plurality of beams in order to allow the second UE to identify a beam from the plurality of beams to establish sidelink communication between the first UE and the second UE.

Any of the above example apparatus, wherein the instructions to identify the direction of traffic based on determining whether the first UE is scheduled to one or both of transmit or receive the data from the second UE, may further comprise instructions executed by the processor to: determine that the first UE requests receiving the data from the second UE; identify the direction of traffic as a transmission from the second UE to the first UE, wherein the direction of traffic indication from the second UE to the first UE allows the second UE to omit monitoring a receiver pool of resources for any transmission from the second UE.

Any of the above example apparatus, the instructions to identify the direction of traffic based on determining whether the first UE is scheduled to one or both of transmit or receive the data from the second UE, may further comprise instructions executed by the processor to: determine that the first UE requests transmission of the data to the second UE; identify the direction of traffic as a transmission from the first UE to the second UE, wherein the direction of traffic indication from the first UE to the second UE allows the first UE to omit monitoring a receiver pool of resources for any transmission from the second UE.

Any of the above example apparatus, the instructions to identify the direction of traffic based on determining whether the first UE is scheduled to one or both of transmit or receive the data from the second UE, may further comprise instructions executed by the processor to: determine that the first UE requests both transmission and reception of the data; identify the direction of traffic as a dual transmission from the first UE to the second UE and to the first UE from the second UE, wherein the dual transmission traffic indication configures the first UE to activate both transmitter and receiver pools of resources.

An example, non-transitory computer readable medium storing instructions, executable by a processor, for wireless communications, comprising instructions for: initiating, at a first user equipment (UE), an initial beam-pairing procedure to establish sidelink communication with a second UE; determining whether the first UE is scheduled to one or both of transmit or receive data from the second UE; identifying a direction of traffic based on determining whether the first UE is scheduled to one or both of transmit or receive the data from the second UE; and transmitting a random access signal on resources corresponding to a beam synchronization control signal from the first UE to the second UE, wherein the random access signal includes information associated with the direction of traffic.

The above example non-transitory computer readable medium, wherein transmitting the random access signal may include identifying a beam from a plurality of directional beams to establish sidelink communication between the first UE and the second UE, wherein the first UE and the second UE directly communicate to each other using the identified beam.

Any of the above example non-transitory computer readable medium, wherein transmitting the random access signal may include transmitting the random access signal on a plurality of beams in order to allow the second UE to identify a beam from the plurality of beams to establish sidelink communication between the first UE and the second UE.

Any of the above example non-transitory computer readable medium, wherein identifying the direction of traffic based on determining whether the first UE is scheduled to one or both of transmit or receive the data from the second UE, comprises: determining that the first UE requests receiving the data from the second UE; identifying the direction of traffic as a transmission from the second UE to the first UE, wherein the direction of traffic indication from the second UE to the first UE allows the second UE to omit monitoring a receiver pool of resources for any transmission from the second UE.

Any of the above example non-transitory computer readable medium, wherein identifying the direction of traffic based on determining whether the first UE is scheduled to one or both of transmit or receive the data from the second UE, comprises: determining that the first UE requests transmission of the data to the second UE; identifying the direction of traffic as a transmission from the first UE to the second UE, wherein the direction of traffic indication from the first UE to the second UE allows the first UE to omit monitoring a receiver pool of resources for any transmission from the second UE.

Any of the above example non-transitory computer readable medium, wherein identifying the direction of traffic based on determining whether the first UE is scheduled to one or both of transmit or receive the data from the second UE, comprises: determining that the first UE requests both transmission and reception of the data; identifying the direction of traffic as a dual transmission from the first UE to the second UE and to the first UE from the second UE, wherein the dual transmission traffic indication configures the first UE to activate both transmitter and receiver pools of resources.

An example, apparatus for wireless communications, comprising: means for initiating, at a first user equipment (UE), an initial beam-pairing procedure to establish sidelink communication with a second UE; determining whether the first UE is scheduled to one or both of transmit or receive data from the second UE; means for identifying a direction of traffic based on determining whether the first UE is scheduled to one or both of transmit or receive the data from the second UE; and means for transmitting a random access signal on resources corresponding to a beam synchronization control signal from the first UE to the second UE, wherein the random access signal includes information associated with the direction of traffic.

The above example apparatus, wherein means for transmitting the random access signal may include means for identifying a beam from a plurality of directional beams to establish sidelink communication between the first UE and the second UE, wherein the first UE and the second UE directly communicate to each other using the identified beam.

Any of the above example apparatus, wherein means for transmitting the random access signal may include means for transmitting the random access signal on a plurality of beams in order to allow the second UE to identify a beam from the plurality of beams to establish sidelink communication between the first UE and the second UE.

Any of the above example apparatus, wherein means for identifying the direction of traffic based on determining whether the first UE is scheduled to one or both of transmit or receive the data from the second UE, comprises: determining that the first UE requests receiving the data from the second UE; means for identifying the direction of traffic as a transmission from the second UE to the first UE, wherein the direction of traffic indication from the second UE to the first UE allows the second UE to omit monitoring a receiver pool of resources for any transmission from the second UE.

Any of the above example apparatus, wherein means for identifying the direction of traffic based on determining whether the first UE is scheduled to one or both of transmit or receive the data from the second UE, comprises: means for determining that the first UE requests transmission of the data to the second UE; means for identifying the direction of traffic as a transmission from the first UE to the second UE, wherein the direction of traffic indication from the first UE to the second UE allows the first UE to omit monitoring a receiver pool of resources for any transmission from the second UE.

Any of the above example apparatus, wherein means for identifying the direction of traffic based on determining whether the first UE is scheduled to one or both of transmit or receive the data from the second UE, comprises: means for determining that the first UE requests both transmission and reception of the data; means for identifying the direction of traffic as a dual transmission from the first UE to the second UE and to the first UE from the second UE, wherein the dual transmission traffic indication configures the first UE to activate both transmitter and receiver pools of resources.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The detailed description set forth above in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems are also presented with reference to various apparatus and methods. These apparatus and methods are described in the detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout the disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 902.11 (Wi-Fi), IEEE 902.16 (WiMAX), IEEE 902.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A and/or 5G New Radio (NR) system for purposes of example, and LTE or 5G NR terminology is used in much of the description below, although the techniques are applicable beyond LTE/LTE-A and 5G NR applications, e.g., to other next generation communication systems).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications, comprising:
    initiating, at a first user equipment (UE), an initial beam-pairing procedure to establish sidelink communication with a second UE; and
    transmitting a random access signal on resources corresponding to a beam synchronization control signal from the first UE to the second UE, wherein the random access signal includes information to indicate a direction of traffic requested by the first UE that identifies whether the first UE initiating sidelink communication with the second UE is requesting transmission, reception, or both transmission and reception of data from the second UE.

2. The method of claim 1, wherein transmitting the random access signal on the resources corresponding to a beam synchronization control signal from the first UE to the second UE comprises:
    identifying a beam from a plurality of directional beams to establish sidelink communication between the first UE and the second UE, wherein the first UE and the second UE directly communicate to each other using the identified beam.

3. The method of claim 1, wherein transmitting the random access signal on the resources corresponding to a beam synchronization control signal from the first UE to the second UE comprises:
    transmitting the random access signal on a plurality of beams to the second UE; and
    wherein the method further comprises:
        establishing communication between the first UE and the second UE over one or more of beams from the plurality of beams used for transmission of the random access signal to the second UE.

4. The method of claim 1, wherein the method further comprises:
    determining that the first UE requests receiving the data from the second UE; and
    identifying the direction of traffic as a transmission from the second UE to the first UE, wherein the direction of traffic indication from the second UE to the first UE allows the second UE to omit monitoring a receiver pool of resources for any transmission from the second UE.

5. The method of claim 1, wherein the method further comprises:
    determining that the first UE requests transmission of the data to the second UE;
    identifying the direction of traffic as a transmission from the first UE to the second UE; and
    omitting monitoring a receiver pool of resources for any transmission from the second UE based on the direction of traffic being the transmission from the first UE to the second UE.

6. The method of claim 1, wherein the method further comprises:
    determining that the first UE requests both transmission and reception of the data; and
    identifying the direction of traffic as a dual transmission from the first UE to the second UE and to the first UE from the second UE, wherein the dual transmission traffic indication configures the first UE to activate both transmitter and receiver pools of resources.

7. An apparatus for wireless communications, comprising:
    a memory configured to store instructions;
    a processor communicatively coupled with the memory, the processor configured to execute the instructions to:
        initiate, at a first user equipment (UE), an initial beam-pairing procedure to establish sidelink communication with a second UE; and
        transmit a random access signal on resources corresponding to a beam synchronization control signal from the first UE to the second UE to allow the second UE to identify a beam from the plurality of beams to establish sidelink communication between the first UE and the second UE, wherein the random access signal includes information to indicate a direction of traffic requested by the first UE that identifies whether the first UE initiating sidelink communication with the second UE is requesting transmission, reception, or both transmission and reception of data from the second UE.

8. The apparatus of claim 7, wherein the instructions to transmit the random access signal on the resources corresponding to a beam synchronization control signal from the first UE to the second UE are further executable to:
    identify a beam from a plurality of directional beams to establish sidelink communication between the first UE and the second UE, wherein the first UE and the second UE directly communicate to each other using the identified beam.

9. The apparatus of claim 7, wherein the instructions to transmit the random access signal on the resources corresponding to a beam synchronization control signal from the first UE to the second UE are further executable to:
    transmit the random access signal on a plurality of beams to the second UE; and
    wherein the instructions are further executable to:
        establish communication between the first UE and the second UE over one or more of beams from the plurality of beams used for transmission of the random access signal to the second UE.

10. The apparatus of claim 7, wherein the instructions are further executable to:
    determine that the first UE requests receiving the data from the second UE; and
    identify the direction of traffic as a transmission from the second UE to the first UE, wherein the direction of traffic indication from the second UE to the first UE allows the second UE to omit monitoring a receiver pool of resources for any transmission from the second UE.

11. The apparatus of claim 7, wherein the instructions are further executable to:
    determine that the first UE requests transmission of the data to the second UE;
    identify the direction of traffic as a transmission from the first UE to the second UE; and
    omitting monitoring a receiver pool of resources for any transmission from the second UE based on the direction of traffic being the transmission from the first UE to the second UE.

12. The apparatus of claim 7, wherein the instructions are further executable to:
    determine that the first UE requests both transmission and reception of the data; and identify the direction of traffic as a dual transmission from the first UE to the second UE and to the first UE from the second UE, wherein the dual transmission traffic indication configures the first UE to activate both transmitter and receiver pools of resources.

13. A non-transitory computer readable medium storing instructions, executable by a processor, for wireless communications, comprising instructions for:
    initiating, at a first user equipment (UE), an initial beam-pairing procedure to establish sidelink communication with a second UE; and
    transmitting a random access signal on resources corresponding to a beam synchronization control signal from the first UE to the second UE to allow the second UE to identify a beam from the plurality of beams to establish sidelink communication between the first UE and the second UE, wherein the random access signal includes information to indicate a direction of traffic requested by the first UE that identifies whether the first UE initiating sidelink communication with the second UE is requesting transmission, reception, or both transmission and reception of data from the second UE.

14. The non-transitory computer readable medium of claim 13, wherein transmitting the random access signal on the resources corresponding to a beam synchronization control signal from the first UE to the second UE comprises instructions for:
    identifying a beam from a plurality of directional beams to establish sidelink communication between the first UE and the second UE, wherein the first UE and the second UE directly communicate to each other using the identified beam.

15. The non-transitory computer readable medium of claim 13, wherein transmitting the random access signal on the resources corresponding to a beam synchronization control signal from the first UE to the second UE comprises instructions for:
    transmitting the random access signal on a plurality of beams to the second UE; and
    wherein the instructions are further executable by the processor for:
        establishing communication between the first UE and the second UE over one or more of beams from the plurality of beams used for transmission of the random access signal to the second UE.

16. The non-transitory computer readable medium of claim 13, wherein the instructions are further executable for:
    determining that the first UE requests receiving the data from the second UE; and
    identifying the direction of traffic as a transmission from the second UE to the first UE, wherein the direction of traffic indication from the second UE to the first UE allows the second UE to omit monitoring a receiver pool of resources for any transmission from the second UE.

17. The non-transitory computer readable medium of claim 13, wherein the instructions are further executable for:
    determining that the first UE requests transmission of the data to the second UE;
    identifying the direction of traffic as a transmission from the first UE to the second UE; and
    omitting monitoring a receiver pool of resources for any transmission from the second UE based on the direction of traffic being the transmission from the first UE to the second UE.

18. The non-transitory computer readable medium of claim 13, wherein the instructions are further executable by the processor for:
    determining that the first UE requests both transmission and reception of the data; and
    identifying the direction of traffic as a dual transmission from the first UE to the second UE and to the first UE from the second UE, wherein the dual transmission traffic indication configures the first UE to activate both transmitter and receiver pools of resources.

19. An apparatus for wireless communications, comprising:
    means for initiating, at a first user equipment (UE), an initial beam-pairing procedure to establish sidelink communication with a second UE; and
    means for transmitting a random access signal on resources corresponding to a beam synchronization control signal from the first UE to the second UE to allow the second UE to identify a beam from the plurality of beams to establish sidelink communication between the first UE and the second UE, wherein the random access signal includes information to indicate a direction of traffic requested by the first UE that identifies whether the first UE initiating sidelink communication with the second UE is requesting transmission, reception, or both transmission and reception of data from the second UE.

20. The apparatus of claim 19, wherein means for transmitting the random access signal on the resources corresponding to a beam synchronization control signal from the first UE to the second UE further comprises:
    means for identifying a beam from a plurality of directional beams to establish sidelink communication between the first UE and the second UE, wherein the first UE and the second UE directly communicate to each other using the identified beam.

* * * * *